(12) United States Patent
Livesay et al.

(10) Patent No.: US 9,914,386 B2
(45) Date of Patent: Mar. 13, 2018

(54) LOAD BEARING RAIL AND TIE-DOWN RING ASSEMBLY

(71) Applicant: Sunrez Corp., El Cajon, CA (US)

(72) Inventors: Mark Livesay, El Cajon, CA (US); Bret Tollgaard, El Cajon, CA (US)

(73) Assignee: Sunrez, Inc., El Cajon, CA (US)

( * ) Notice: Subject to any disclaimer, the term of this patent is extended or adjusted under 35 U.S.C. 154(b) by 0 days.

(21) Appl. No.: 15/140,916

(22) Filed: Apr. 28, 2016

(65) Prior Publication Data

US 2017/0021756 A1 Jan. 26, 2017

Related U.S. Application Data

(60) Provisional application No. 62/153,645, filed on Apr. 28, 2015.

(51) Int. Cl.
*B60P 7/08* (2006.01)

(52) U.S. Cl.
CPC .................. *B60P 7/0807* (2013.01)

(58) Field of Classification Search
CPC ..... B60P 7/0807; B60P 7/0815; B60P 7/0823; B60P 1/286; B60P 3/07; B60P 3/122; B60P 7/15; B60P 1/00
USPC ... 410/106, 10, 116, 112, 97, 102, 143, 155, 410/2, 32, 39, 94; 296/186.1, 191, 182.1, 296/100.02, 100.1, 183.1, 43, 41
See application file for complete search history.

(56) References Cited

U.S. PATENT DOCUMENTS

| | | | | |
|---|---|---|---|---|
| 4,987,654 | A * | 1/1991 | Mejias | A44C 5/2042 24/170 |
| 6,138,975 | A * | 10/2000 | McDaid | B61D 45/001 248/499 |
| 6,431,543 | B1 * | 8/2002 | Cole | A63F 9/10 206/579 |
| 7,686,551 | B2 * | 3/2010 | Grasso | B60P 7/0807 410/106 |
| 8,376,675 | B2 * | 2/2013 | Schulze | B64D 9/003 410/104 |
| 8,465,065 | B2 * | 6/2013 | Browne | B60N 3/023 16/110.1 |
| 8,662,804 | B2 * | 3/2014 | Thoma | B60P 7/0807 410/106 |

* cited by examiner

*Primary Examiner* — D Glenn Dayoan
*Assistant Examiner* — Sunsurraye Westbrook
(74) *Attorney, Agent, or Firm* — Lewis Kohn & Walker LLP; David M. Kohn; Kari Moyer-Henry

(57) ABSTRACT

A cargo restraint system having a load bearing perimeter rail and a tie-down ring assembly. The load bearing perimeter rail further comprised of a plurality of protruding bosses with a hole within each boss. Further, a tie-down ring assembly comprised of a tie-down ring and a pin wherein the tie-down ring is inserted through the hole in the plurality of protruding bosses of the load bearing perimeter rail.

13 Claims, 8 Drawing Sheets

LOAD BEARING RAIL AND TIE-DOWN RING ASSEMBLY

RELATED APPLICATIONS

This application is a non-provisional application claiming the benefit of priority from U.S. Provisional Application No. 62/153,645, filed on Apr. 28, 2015, the entire contents of which are herein incorporated by reference.

BACKGROUND OF THE INVENTION

Conventional air cargo pallets consist of an outer rail which runs along the perimeter of a sandwich panel core. This outer rail has holes in which a tie-down ring and bracket assembly are then attached to said outer rail by one time use fasteners. Said fasteners are difficult to remove when replacing a tie-down ring and bracket assembly. Additionally, because tie-down rings and brackets are a fixed assembly, when one or the other is damaged, both must be replaced, increasing the cost of repair. Also, due to the nature of the current fasteners, point loads incur upon force being applied to said tie-down ring and high levels of stress are experienced at the attachment points between the outer rail and tie-down ring. The described tie down ring and load bearing rail assembly obviates these problems by providing a much stronger ring assembly that can carry higher loads, but is designed in a way that provides load paths that distribute and avoid the concentrated high stress loading points, and is furthermore assembled from components that are re-usable and provide a simple mechanism to assemble, disassemble, and reassemble the tie down ring and load bearing rail assembly.

SUMMARY OF THE INVENTION

The present invention is in the technical field of load bearing hardware. More particularly, the present invention is in the technical field of restraint systems. More particularly, the present invention is in the technical field of rail and hardware integration methods.

It is an object of the present invention to provide a method for attaching a tie-down ring to a load bearing rail system.

It is another object of the present invention to provide a load bearing rail and ring assembly capable of being pulled in any direction at 7,500 pounds without yielding.

It is still another object of the present invention to provide a load bearing rail and ring assembly capable of being pulled up to 11,250 pounds without ultimate failure.

DETAILED DESCRIPTION OF THE INVENTION

Figure 1:
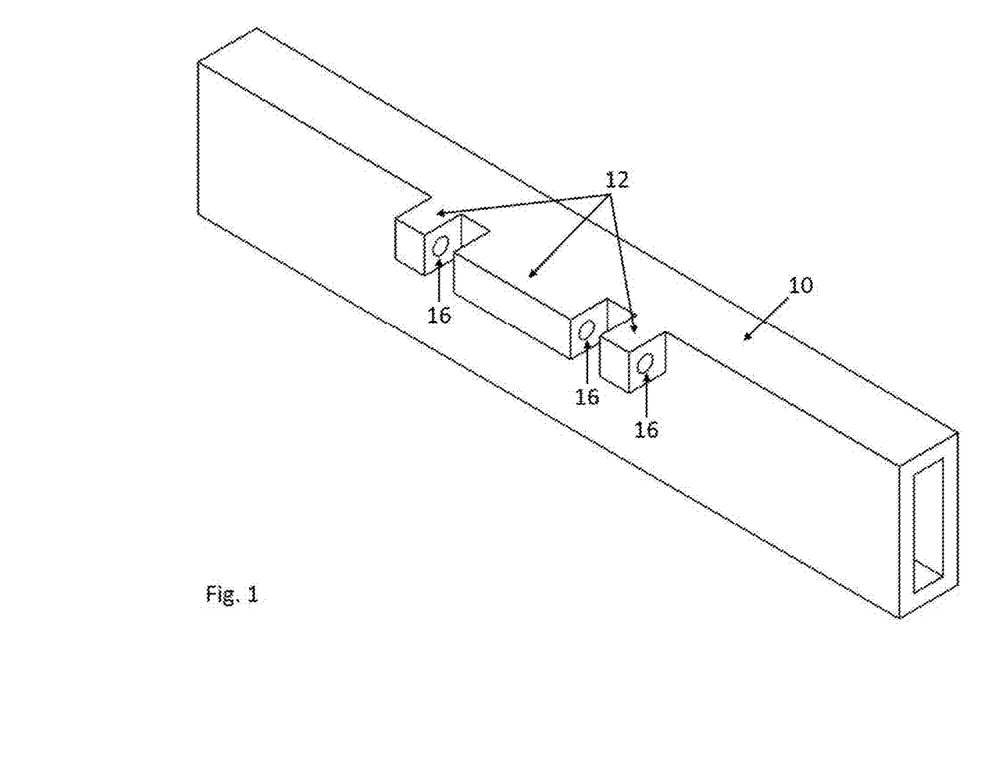
FIG. 1 is a perspective view of the protruding bosses of the load bearing perimeter rail of the present invention.
Figure 2:
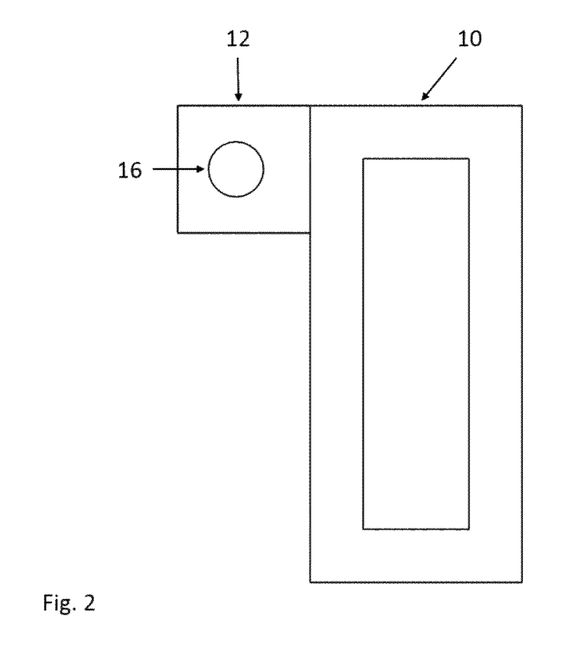
FIG. 2 is a side view of the protruding bosses of the load bearing perimeter rail of the present invention.

Referring now to the invention in more detail, FIG. 1 and FIG. 2 illustrate an improved load bearing perimeter rail 10 with protruding bosses 12 which are integral to the load bearing perimeter rail 10. The bosses 12 each have a hole 16 which extends completely through each boss 12 in an orientation parallel to perimeter rail 10.

In more detail, FIG. 1 and FIG. 2 further illustrate load bearing perimeter rail 10 including integral bosses 12 which are designed to withstand loads transferred to it by load bearing hardware which fits between bosses 12. The holes 16 in the bosses 12 are designed to accommodate a pin or bolt (as shown in FIG. 3) which allows load bearing hardware to rotate within the holes 16.

In further detail, FIG. 1 and FIG. 2 illustrate load bearing perimeter rail 10 shaped such that its thicknesses and contours are sufficient at distributing all necessary loads. Load bearing perimeter rail 10 is roughly 2.25" tall and 1.6" wide from tip of bosses 12 to back wall of load bearing perimeter rail 10. Each boss 12 is approximately 0.6"×0.6" square and sufficiently thick about hole 16, such as 0.15", and are a structural member of load bearing perimeter rail 10.

The load bearing perimeter rail 10 shown in FIG. 1 and FIG. 2 may be made of aluminum or any other sufficiently rigid and strong material such as composites, metals, or plastics. Load bearing perimeter rail 10 may be manufactured by extrusion, pultrusion, casting, and any other methods in which a sufficiently strong load bearing perimeter rail 10 can be made. Boss 12 is an integral member of load bearing perimeter rail 10 and is therefore constructed of the same materials as load bearing perimeter rail 10 whereas hole 16 in boss 12 represents the absence of said material of load bearing perimeter rail 10.

Figure 3:
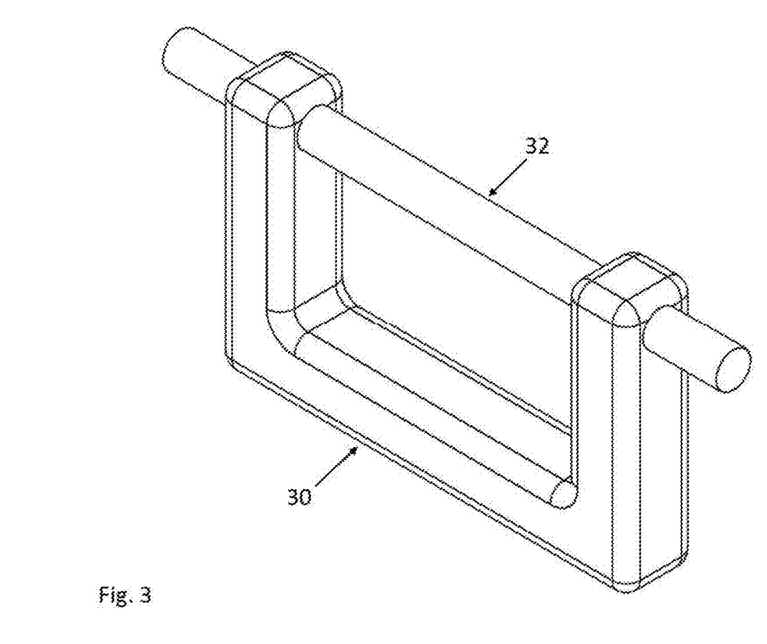
FIG. 3 is a perspective view of the ring assembly of the present invention.

With reference to FIG. 3 shown is the tie-down ring assembly. This tie-down ring assembly consists of the tie-down ring 30 and pin 32. Tie-down ring 30 rotates about pin 32. Pin 32 transfers loads from tie-down ring 30 into the surrounding material about pin 32. The tie-down ring 30 is shaped such that its thicknesses and contours are sufficient at distributing all necessary loads, roughly 3" wide and 1.80" tall. Pin 32 is similarly sized according to load requirements, measuring approximately 0.25" in diameter and roughly 4" long.

The tie-down ring assembly shown in FIG. 3 may be made of a high-strength steel for tie-down ring 30 or any other sufficiently rigid and strong material such as composites, metals, or high-strength plastics. Similarly, bolt 32 is composed of high-strength steel or any other sufficiently rigid and strong material such as composites, metals, or high-strength plastics. The geometry of tie-down ring 30 and pin 32 is such that it meets all necessary load requirements for the application, and as such, can accommodate a range of geometries to suit the needs of the given application.

Figure 4:
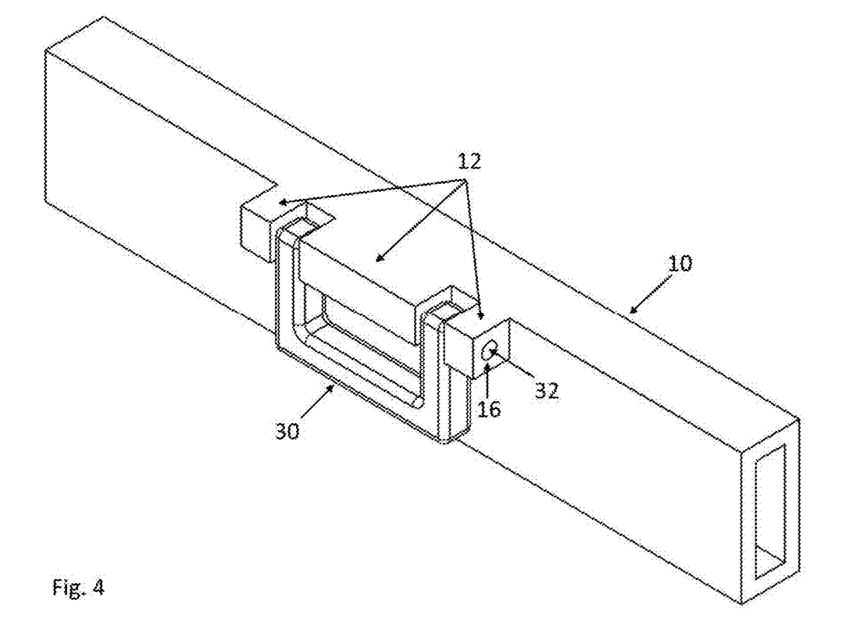
FIG. 4 is a perspective view of the assembled tie-down ring in the protruding bosses of the load bearing perimeter rail of the present invention.
Figure 5:
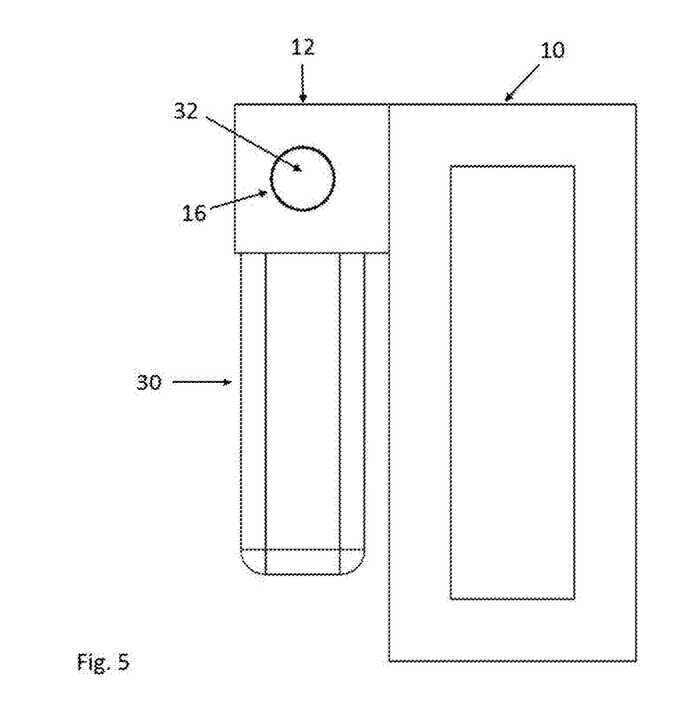
FIG. 5 is a side view of the assembled tie-down ring in the protruding bosses of the load bearing perimeter rail of the present invention.

With reference to FIG. 4 and FIG. 5 shown is the load bearing perimeter rail 10 with protruding bosses 12 that are integral to load bearing perimeter rail 10 with the tie-down ring assembly attached through hole 16. The tie-down ring assembly consists of tie-down ring 30 and pin 32.

In more detail, FIG. 4 and FIG. 5 further illustrate the protruding bosses 12 which are an integral member of load bearing perimeter rail 10 and act as a bracket for which the pin 32 passes through holes 16 located in the bosses 12. Tie-down ring 30 rotates about pin 32 so it may hang freely when not in use or rotate to a desired position when engaged.

In further detail, FIG. 4 and FIG. 5 illustrate the load bearing perimeter rail 10 and integral protruding bosses 12 are shaped such that the loads generated by tie-down ring 30 and pin 32 will be sufficiently strong.

Figure 6:
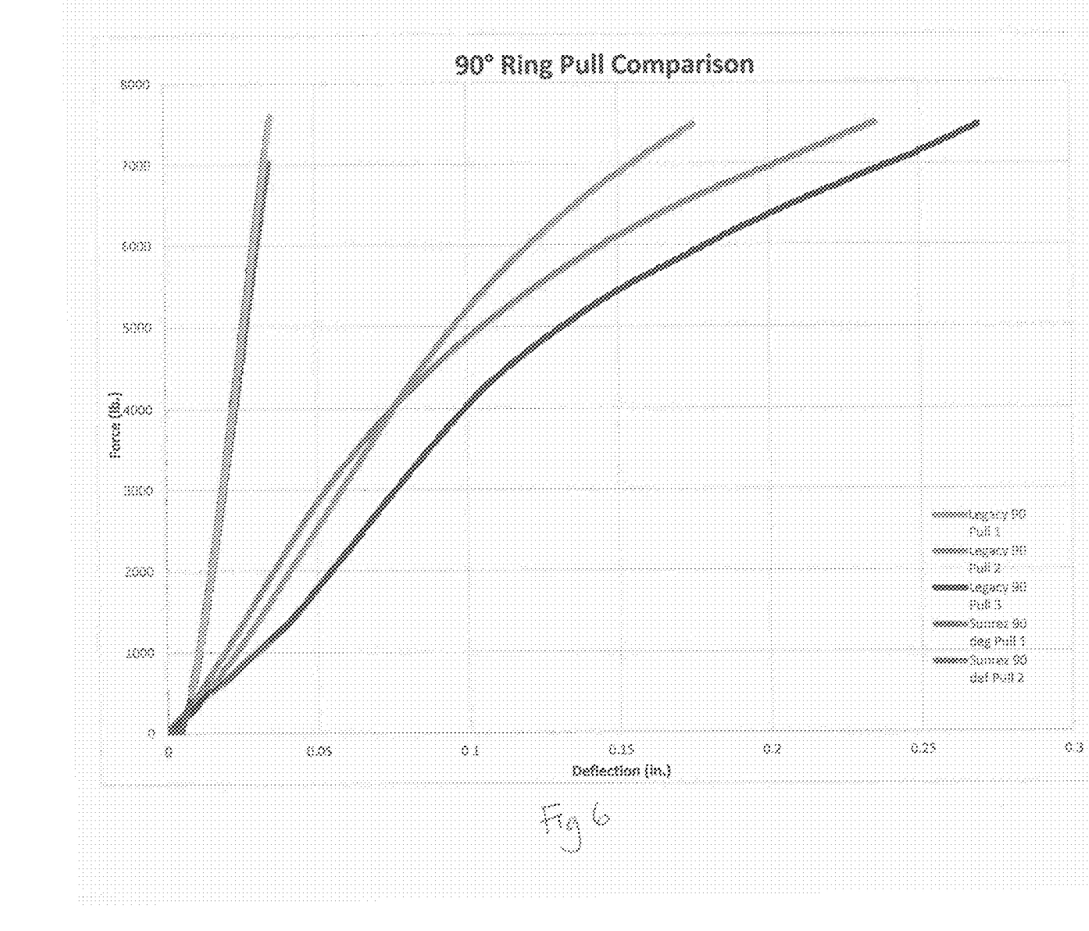
FIG. 6 shows the results of a 90° ring load test comparing the Legacy restraint system and the restraint system of the present invention.
Figure 7:
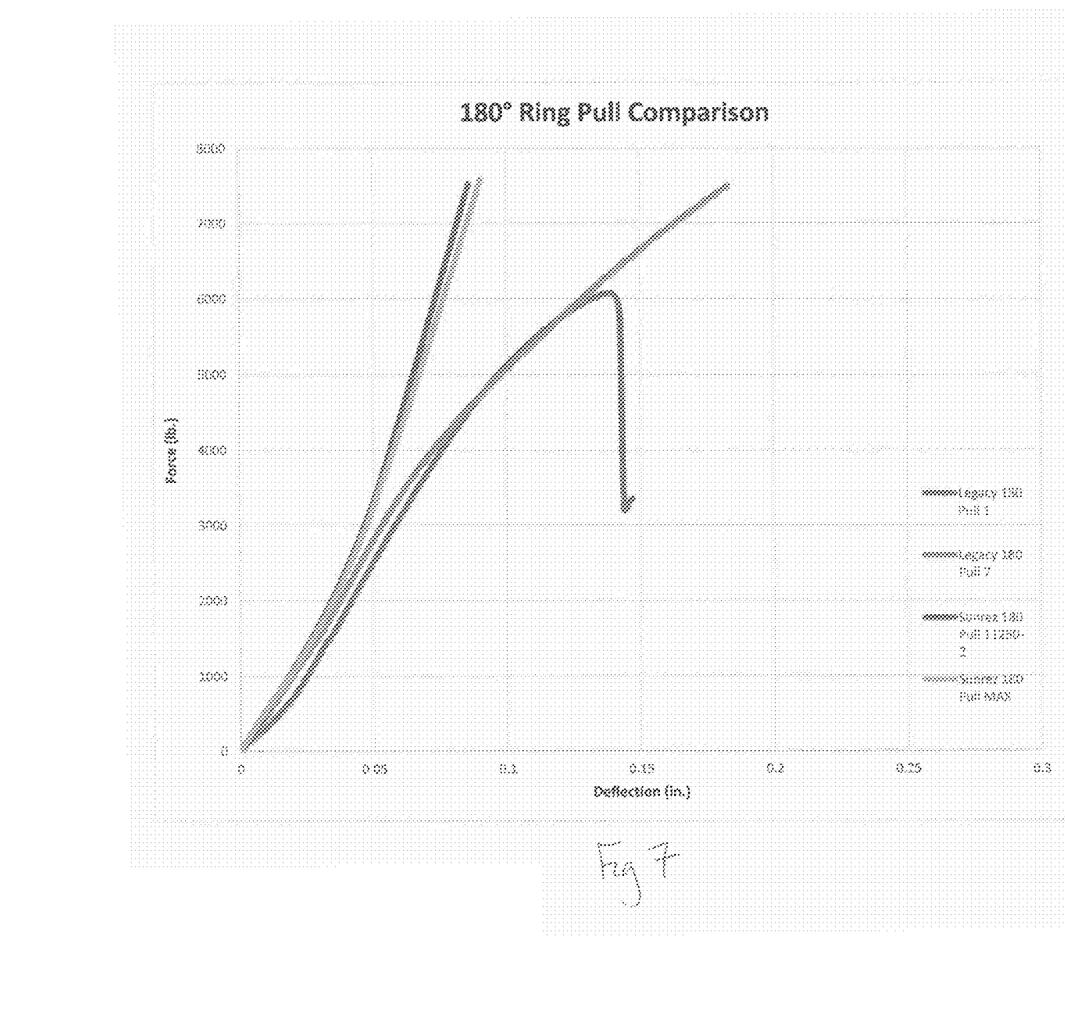
FIG. 7 shows the results of a 180° ring load test comparing the Legacy restraint system and the restraint system of the present invention.
Figure 8:
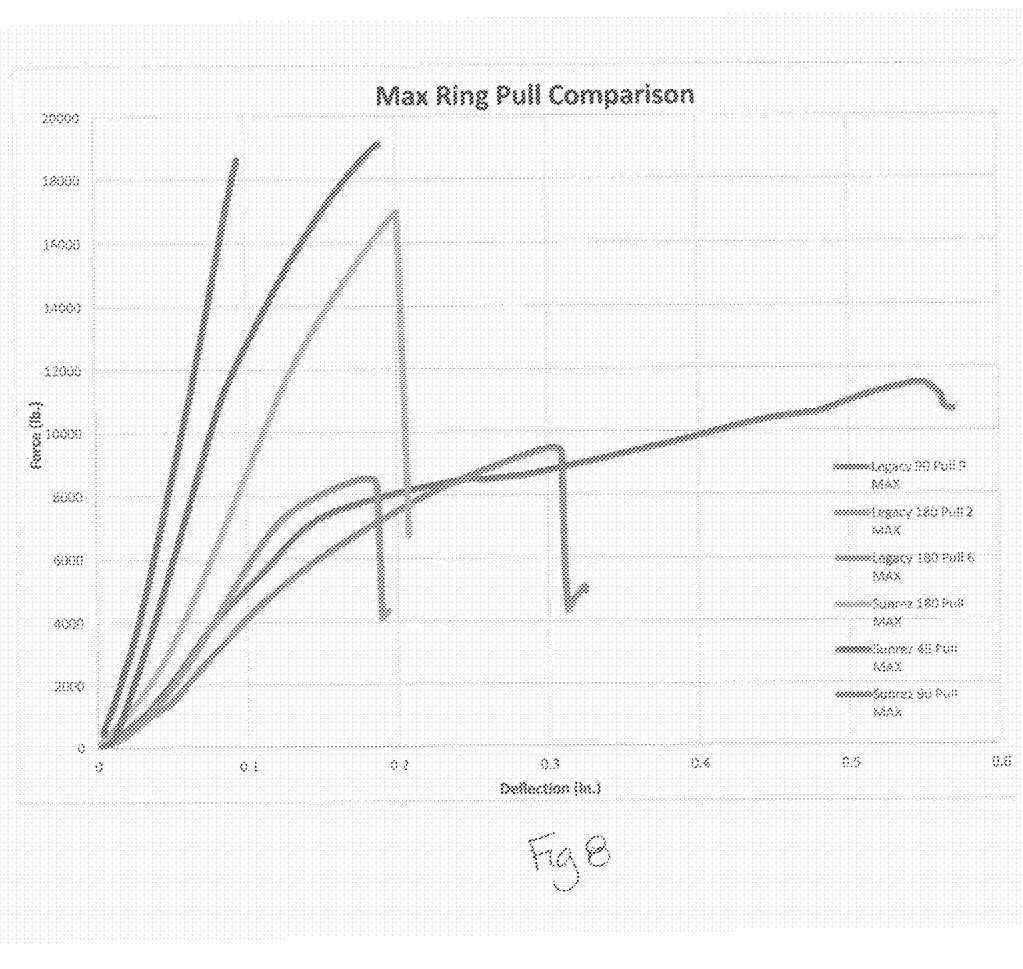
FIG. 8 shows the results of a ring maximum load test comparing the Legacy restraint system and the restraint system of the present invention at various degrees.

Briefly, FIG. 6-FIG. 8 demonstrate the improved performance of the cargo load restraint system of the present invention over the old cargo restraint system of the prior art. For proper functionality, the tie-down ring is capable of rotating at least 225° in a vertical plane wherein the vertical plane intersects with a pallet edge at a right angle. The tie-down rings must be capable of withstanding a load of 7500 pounds along lines forming various degrees with an upper pallet surface without evidence of deformation.

The tie-down rings were load tested along with the old cargo restraint system of the prior art. Specifically, the load tests were performed using a force of up to 7500 pounds at 90° and 180°. Additionally, a maximum load pull comparison was performed in order to determine how much force the tie-down ring is capable of withstanding without ultimate failure. Ultimate failure is defined as breaking of a material.

The data confirms the superior performance of the tie-down ring of the present invention at each force and degree tested. At 90°, the tie-down ring deflected less than 0.05 inch under 7500 pounds of force and less than 0.1 inch at 180° before returning to their initial position upon release of the load, indicating no yielding has taken place. The tie-down ring of the present invention was capable of far exceeding the load requirements and was successfully pulled in any direction without ultimate failure of 11,250 pounds. Further, the cargo load restraint system may be pulled in several directions to over 19,000 pounds without ultimate failure.

Load bearing rails and rings can be made to any length and therefore can be attached to the edge of a structure including but not limited to cargo holds of ships, rail road cars, cargo baskets or roof rack systems of a car, cable bridges (rings or other devices can be used to pass through the bosses on the load bearing cable to support weight/ loads), flooring panels, trucks of various configurations (i.e. pick up, flat bed, utility trucks), rails running on top of a fence or wall with small rings which hold lights or wiring which is drawn across them from another wall to another, rails securely mounted on a wall or ceiling and secured joist to joist and provide strength for hanging or securing items, and stand along and staked to the ground to act as load bearing rails for securing items such as tents, shade screens, or any other item which may draw a cable from one area to another.

EXAMPLES

The following non-limiting examples illustrate the functionality and method of the cargo load restraint system in the most common use scenarios.

Example 1

Load bearing rails are securely attached to the perimeter edges of a 463 L pallet sandwich panel.
Cargo is placed onto top surface of the pallet
Cargo is secured to the pallet by means of straps, chains, and/or nets which are placed on top of the cargo and looped through the tie-down rings on the load bearing rails.
Straps, chains, and/or nets are then tightened atop the cargo to secure it to the top surface of the pallet by applying tension to the tie-down ring and load bearing rail interface.
The cargo load restraint system must be designed such that the tension applied while securing the cargo to the pallet does not damage the tie-down ring and load bearing rail. Additionally, the cargo load restraint system must be designed such that moments of high acceleration (i.e. a quick turn, high speed braking, or crash) are coped with appropriately and no ultimate failure occurs between the tie-down ring and load bearing rail interface.

Example 2

Load bearing rails are mounted to the sides of a truck bed
Cargo is loaded into truck bed
Straps, chains, nets, or other devices can be used to secure the cargo by attaching said restraint devices to rings mounted appropriate distances throughout the length of the load hearing rail.
Straps, chains, nets, or other devices are then tightened and pulled against the load bearing rail through the attached rings until cargo is securely fastened In one embodiment the present invention provides a cargo restraint system comprising a load bearing perimeter rail and a tie-down ring assembly.

In another embodiment the load bearing perimeter rail of the cargo restraint system is further comprised of a plurality of protruding bosses wherein the bosses receive the tie-down ring assembly.

In still another embodiment the tie-down ring assembly is further comprised of a tie-down ring and a pin wherein the tie down ring is inserted through a hole in each of the plurality of protruding bosses of the load bearing perimeter rail. In a preferred embodiment the pin rotates at least 225° within the hole in each of the plurality of protruding bosses. In a most preferred embodiment the pin rotates up to 360° within the hole in each of the plurality of protruding bosses.

In a further embodiment the present invention provides an easily removable tie-down ring from a load bearing perimeter rail in the case of damage or repair.

In another embodiment the present invention provides bosses wherein the bosses as integral members of the load bearing perimeter rail and produce a superior load path for transferring forces from the tie-down ring, into the pin, and ultimately into the perimeter rail via the protruding bosses.

In yet another embodiment the present invention provides a method for manufacturing a perimeter rail wherein the perimeter rail includes protruded bosses in a single piece adding strength to the restraint system while reducing cost and down time for repairs.

In a preferred embodiment the present invention provides a means of attaching a load bearing piece of hardware directly to a rail with integrated bracket system.

In a further preferred embodiment the present invention provides a load bearing rail wherein the protruding bosses act as a bracket for the tie-down ring and eliminate the need for a secondary bracket in securing the tie-down ring.

In still another embodiment the present invention provides a cargo restraint system having a tie-down ring assembly capable of being pulled in any direction at 7,500 pounds without yielding. In a preferred embodiment the cargo restraint system is capable of being pulled in any direction by up to 11,250 pounds without ultimate failure. In a most preferred embodiment the cargo restraint system is capable of being pulled in any direction by up to 19,000 pounds without ultimate failure.

In yet another embodiment the present invention provides a load bearing rail comprised of aluminum or any sufficiently rigid and strong material such as composites, metals, or plastics manufactured by extrusion, pultrusion, casting or any other method of for making a sufficiently strong load bearing perimeter rail. In a preferred embodiment the boss is constructed from the same material as the load bearing perimeter rail.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A cargo restraint system comprising:
a load bearing rail wherein the load bearing rail is further comprised of a plurality of integrated protruding bosses, the protruding bosses protruding generally perpendicular from the load bearing rail, the load bearing rail and the plurality of integrated protruding bosses are manufactured as a single component wherein said load bearing rail is generally rigid in structure, wherein said protruding bosses receive said tie-down ring assembly, and further wherein said protruding bosses are capable of constraining loads from said tie-down ring assembly; and
a tie-down ring assembly consisting of a tie-down ring and attachment hardware, wherein said tie-down ring is generally rigid in structure, wherein said tie-down ring is generally "U" shaped to easily attach a cargo restraint,
wherein the attachment hardware secures said tie-down ring to said integrated protruding bosses of the load bearing rail.

2. The cargo restraint system of claim 1 wherein the attachment hardware is inserted through a hole in each of the plurality of protruding bosses of the load bearing rail generally parallel to the rail.

3. The cargo restraint system of claim 2 wherein the tie-down ring rotates freely about the attachment hardware in each of the plurality of protruding bosses to allow for storage of the tie-down ring when not engaged.

4. The cargo restraint system of claim 2 wherein the tie-down ring is removable from the load bearing rail in the case of damage and repair.

5. The cargo restraint system of claim 1 wherein the protruding bosses located on the load bearing rail create an optimized load path for transferring loads and stresses from the cargo restraints to the tie-down ring, through the attachment hardware, into the protruding bosses, and ultimately into the load bearing rail.

6. The cargo restraint system of claim 3 wherein the tie-down ring rotates at least 225° within the hole of each of the plurality of bosses.

7. The cargo restraint system of claim 1 wherein the tie-down ring assembly is capable of being pulled in any direction at a specified load value without yielding of the ring, the attachment hardware, or the load bearing rail.

8. The cargo restraint system of claim 1 wherein the tie-down ring assembly is capable of being pulled in any direction at a specified load value without experiencing ultimate failure of the ring, the attachment hardware, or the load bearing rail.

9. The cargo restraint system of claim 1 wherein the load bearing rail is attached to at least one side of a cargo pallet.

10. The cargo restraint system of claim 1 wherein the load bearing rail is used in association with at least one end of a sandwich panel constructed panel.

11. The cargo restraint system of claim 1 wherein the load bearing rail receives a tie-down ring assembly which is attached to a cargo restraint device wherein the tie-down ring is secured to said load bearing rail by attachment hardware.

12. A cargo restraint system wherein a load bearing rail accepts a cargo restraint device such as a net or a chain, wherein the cargo restraint device possesses a looped like end geometry in which attachment hardware directly secures said cargo restraint device to protruding bosses with the looped end geometry.

13. A cargo restraint system wherein a load bearing rail with integral bosses is fabricated by way of permanently fixing protruding bosses to a rail by means of welding, brazing, or other fabrication methods in which the protruding bosses are considered permanently fixed and integral to the rail.

* * * * *

UNITED STATES PATENT AND TRADEMARK OFFICE
CERTIFICATE OF CORRECTION

PATENT NO. : 9,914,386 B2
APPLICATION NO. : 15/140916
DATED : March 13, 2018
INVENTOR(S) : Livesay et al.

Page 1 of 1

It is certified that error appears in the above-identified patent and that said Letters Patent is hereby corrected as shown below:

In the Claims

Column 5, Line 34: the word "said" should read "a"; and

Column 5, Line 38: the first occurrence of the word "a" should read "said".

Signed and Sealed this
Fourteenth Day of August, 2018

Andrei Iancu
*Director of the United States Patent and Trademark Office*